(No Model.)
S. LIGHTBURNE, Jr.
HOSE COUPLING.
No. 310,834. Patented Jan. 13, 1885.
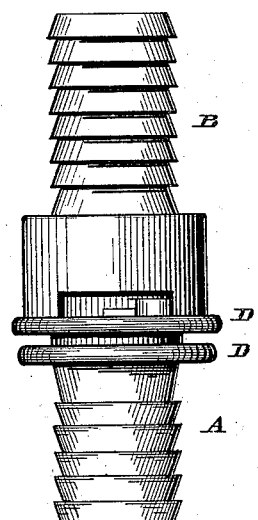
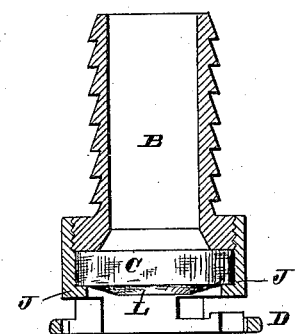
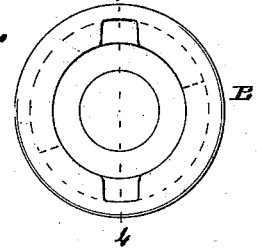
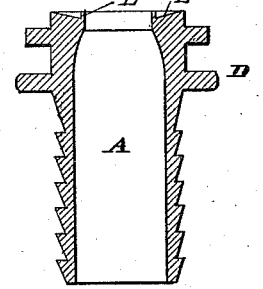
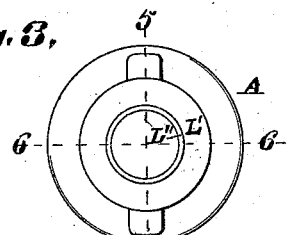
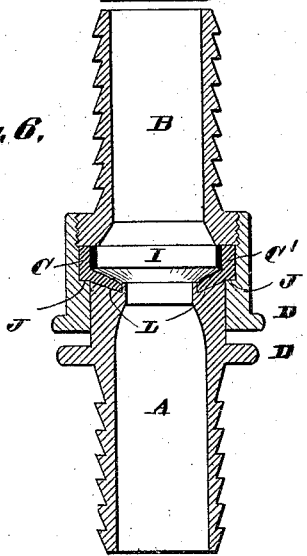
Attest:
Benj. A. Knight
Geo. L. Wheelock
Inventor:
S. Lightburne Jr.
By Knight Bros
Attys

UNITED STATES PATENT OFFICE.

STAFFORD LIGHTBURNE, JR., OF ST. LOUIS, MISSOURI.

HOSE-COUPLING.

SPECIFICATION forming part of Letters Patent No. 310,834, dated January 13, 1885.

Application filed April 21, 1884. (No model.)

*To all whom it may concern:*

Be it known that I, STAFFORD LIGHTBURNE, Jr., of the city of St. Louis, in the State of Missouri, have invented a certain new and useful Improvement in Hose-Couplings, of which the following is a full, clear, and exact description, reference being had to the accompanying drawings, forming part of this specification, and in which—

Figure 1 is a side view. Fig. 2 is an end view of the female member. Fig. 3 is an end view of the male member. Fig. 4 is a longitudinal section of the female member, taken on line 4 4, Fig. 2, the packing being shown in side view. Fig. 5 is a longitudinal section of the male member, taken on line 5 5, Fig. 3; and Fig. 6 is a longitudinal section of the two parts put together, taken on line 6 6, Fig. 3.

My present invention relates to certain improvements on the couplings shown and described in Letters Patent of the United States granted to me, No. 255,523, March 28, 1882, and No. 263,415, August 29, 1882.

My present invention consists in features of novelty hereinafter fully described, and pointed out in the claim.

Referring to the drawings, A represents the male and B the female member of the coupling. They are connected as shown and described in the patents referred to, and are formed the same, except each has a marginal rim, D, and the body of the female member is shown with a screw for the attachment of a hose, instead of a socket, to be attached to a hydrant, and the body of the female member, instead of being cast in one piece with the head, is cast in a separate piece and the two joined or connected by one screwing over the other, as shown in Figs. 4 and 6.

C represents an elastic packing, held in the head of the female member by a metallic ring, I, or by other suitable means, the ring fitting wholly within the cylindrical wall C', so as to permit the body to press on both the ring and packing equally. The packing may be held in place and compressed to prevent leakage between a shoulder, J, of the head and the inner end of the body of the member; but the ring is preferred, and may be used in addition to the shoulders, as it presses the packing outward against the walls of the head of the female member, thus preventing the slightest leakage. The packing has an interior flange, L, inclined inwardly toward the male member, and which fits against the end of the male member in an annular seat, L', formed with interior walls, L'', when the parts are connected. The packing-button differs from those shown in the patents referred to in that it only has a flange, L, at one end, instead of both, the other end abutting against the inner end of the body of the female member.

I claim as my invention—

The coupling herein described, consisting of female member B, having a body and head secured together by screw-threads, the packing C, formed with a cylindrical wall, C', having an interior flange, L, inclined inwardly toward the male member, and the male member A, formed with an interior wall, L'', and annular seat L', the said head having shoulder J, the wall of the packing fitting between the shoulder and the body, and the interior flange occupying the seat and having its inner edge resting against the interior wall, as shown and described.

STAFFORD LIGHTBURNE, JR.

In presence of—
GEO. H. KNIGHT,
BENJN. A. KNIGHT.